US010971960B2

United States Patent
Hoshina et al.

(10) Patent No.: US 10,971,960 B2
(45) Date of Patent: Apr. 6, 2021

(54) CUFF SUPPORT ATTACHED TO AN AXIAL END SURFACE OF A STATOR CORE

(71) Applicant: TOYOTA JIDOSHA KABUSHIKI KAISHA, Toyota-shi (JP)

(72) Inventors: Hiroshi Hoshina, Toyota (JP); Shotaro Okamoto, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 67 days.

(21) Appl. No.: 15/910,116

(22) Filed: Mar. 2, 2018

(65) Prior Publication Data

US 2018/0254674 A1 Sep. 6, 2018

(30) Foreign Application Priority Data

Mar. 3, 2017 (JP) .............................. JP2017-040362

(51) Int. Cl.
| | |
|---|---|
| H02K 3/34 | (2006.01) |
| H02K 1/18 | (2006.01) |
| H02K 3/12 | (2006.01) |
| H02K 1/16 | (2006.01) |
| H02K 3/50 | (2006.01) |

(52) U.S. Cl.
CPC .............. *H02K 1/185* (2013.01); *H02K 1/16* (2013.01); *H02K 3/12* (2013.01); *H02K 3/50* (2013.01)

(58) Field of Classification Search
CPC ............ H02K 1/185; H02K 1/18; H02K 1/16; H02K 3/12; H02K 3/32; H02K 3/34; H02K 3/345; H02K 2203/12; H02K 15/0025; H02K 15/0037

USPC ................................ 310/208, 214–215, 260
See application file for complete search history.

(56) References Cited

U.S. PATENT DOCUMENTS

| | | | | |
|---|---|---|---|---|
| 9,300,173 | B2* | 3/2016 | Marschall | H02K 1/16 |
| 10,027,197 | B2* | 7/2018 | Mizutani | H02K 3/48 |
| 2007/0194653 | A1 | 8/2007 | Prokscha et al. | |
| 2013/0320800 | A1* | 12/2013 | Senoo | H02K 3/325 |
| | | | | 310/214 |

(Continued)

FOREIGN PATENT DOCUMENTS

| | | |
|---|---|---|
| CN | 103457381 A | 12/2013 |
| CN | 104904104 A | 9/2015 |

(Continued)

OTHER PUBLICATIONS

Machine translation of JP-2016111844-A. (Year: 2016).*
Machine translation of JP-2016093055-A. (Year: 2016).*

*Primary Examiner* — Michael Andrews
(74) *Attorney, Agent, or Firm* — Sughrue Mion, PLLC

(57) ABSTRACT

A cuff support attached to an axial end surface of a stator core including an annular yoke, a plurality of teeth, and a plurality of slots formed between the teeth includes: an annular plate making contact with the yoke; a plurality of ribs projecting toward an inner peripheral side of the annular plate so as to correspond to the teeth; and a plurality of spaces formed between the ribs so as to correspond to the slots. The cuff support is made of an elastic member. The ribs are being apart from the axial end surface of the stator core from roots of the ribs toward tip ends of the ribs. When a coil is wound around the teeth and the ribs so as to pass through the slots and the spaces, the ribs are brought into pressure contact with the coil due to an elastic force.

3 Claims, 9 Drawing Sheets

(56) References Cited

U.S. PATENT DOCUMENTS

2017/0133901 A1* 5/2017 Burch ..................... H02K 3/38

FOREIGN PATENT DOCUMENTS

| JP | 2014-7940 A | | 1/2014 |
|----|----|----|----|
| JP | 2016-032392 A | | 3/2016 |
| JP | 2016093055 A | * | 5/2016 |
| JP | 2016111844 A | * | 6/2016 |

* cited by examiner

A-A SECTION

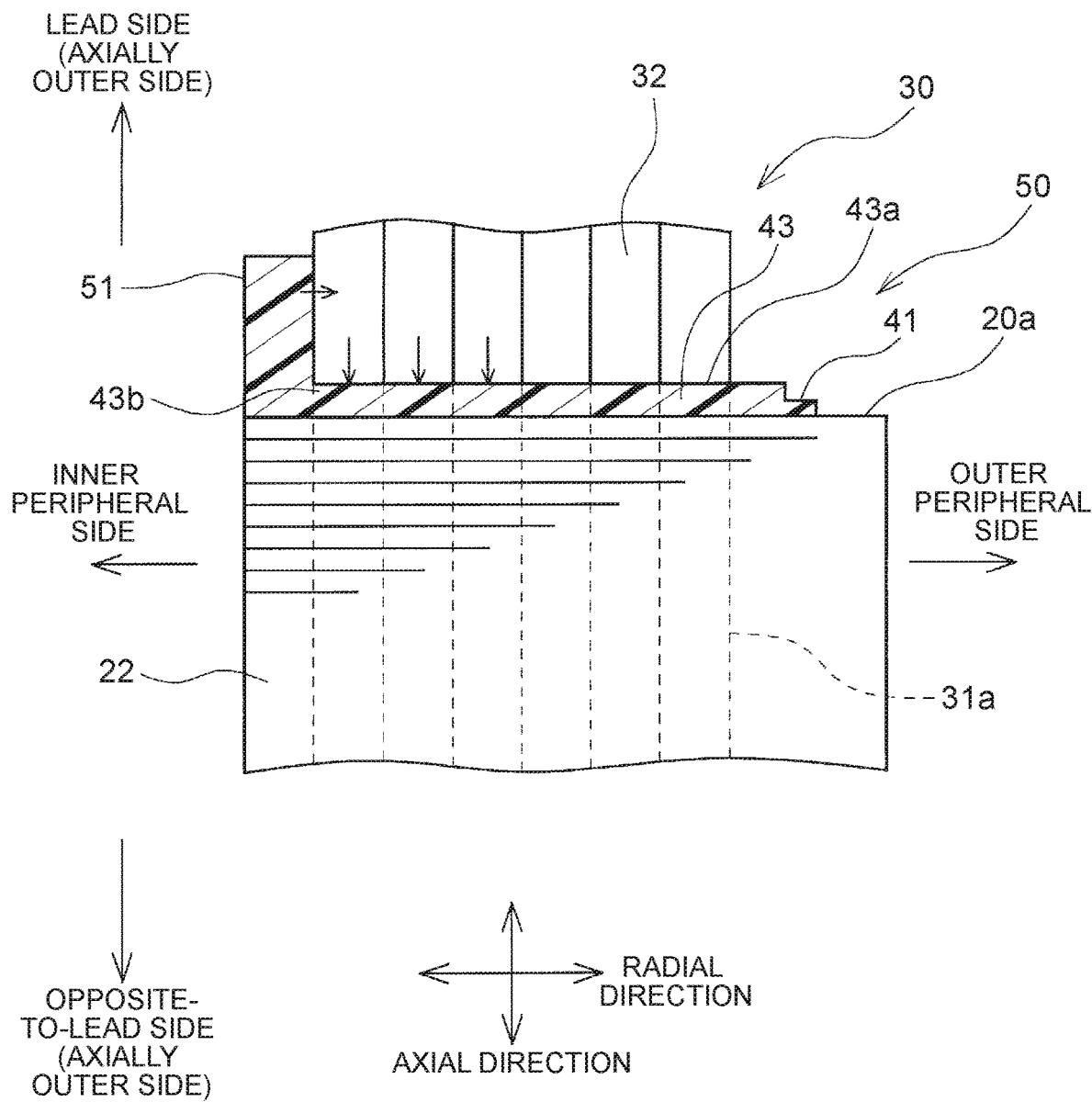

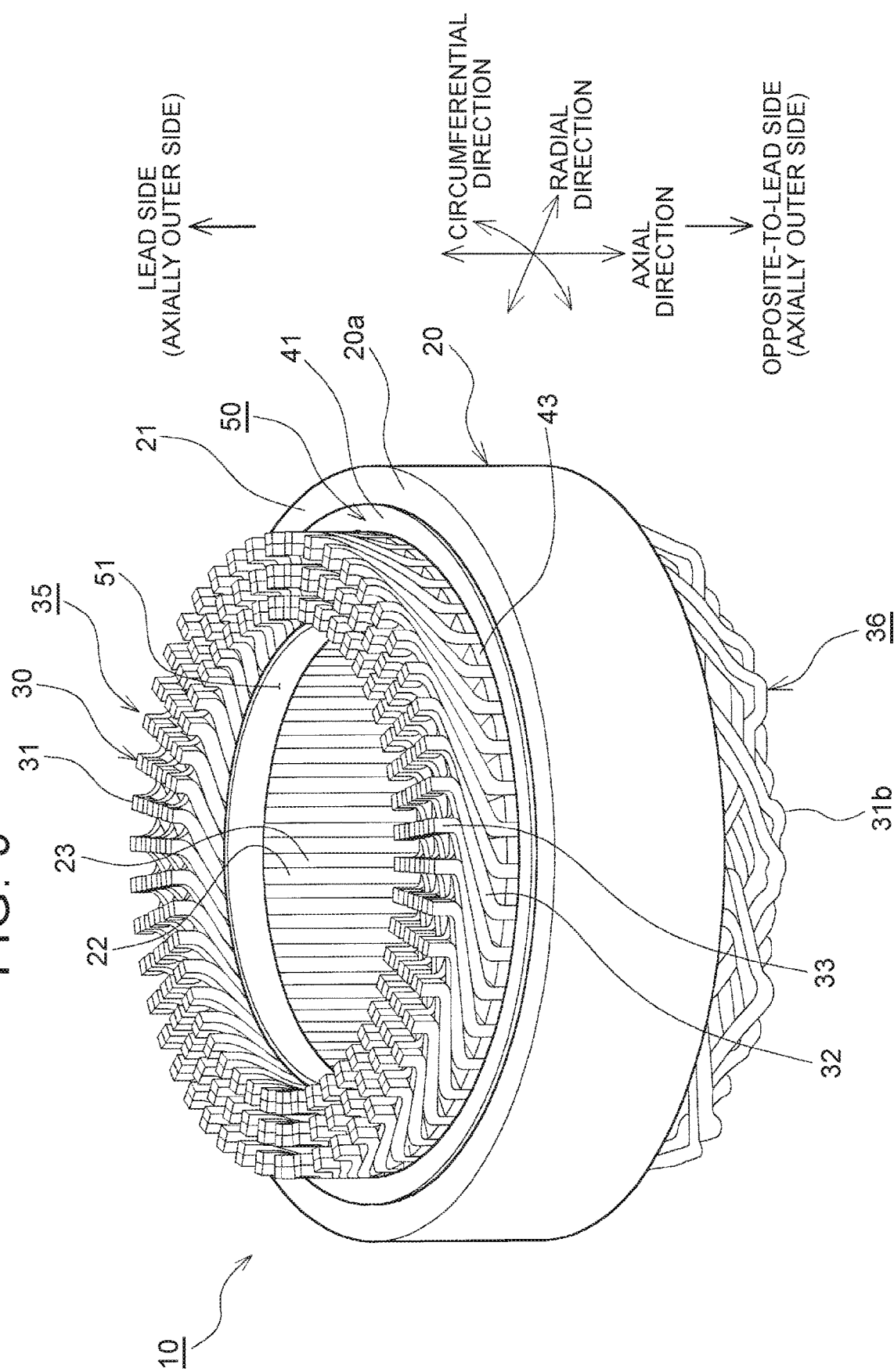

CUFF SUPPORT ATTACHED TO AN AXIAL END SURFACE OF A STATOR CORE

INCORPORATION BY REFERENCE

The disclosure of Japanese Patent Application No. 2017-040362 filed on Mar. 3, 2017 including the specification, drawings and abstract is incorporated herein by reference in its entirety.

BACKGROUND

1. Technical Field

The present disclosure relates to a structure of a cuff support attached to an axial end surface of a stator core for a rotary electric machine.

2. Description of Related Art

A rotor electric machine often uses a distributed-winding coil in which a conductor wire is wound over a plurality of teeth such that the conductor wire is passed through a slot of a stator core from a first side and the conductor wire projecting from a second side is bent in a circumferential direction and then passed through another slot distanced from the above slot. In recent years, there has been used a method for forming a distributed-winding coil such that: a conductor segment formed by shaping a flat wire in a U-shape is used as a conductor wire; a linear part of the conductor segment is inserted into a slot from a first axial end surface of a stator core; and the linear part projecting from a second axial end surface of the stator core is bent in a circumferential direction and welded with a flat wire projecting from another slot (e.g., see Japanese Patent Application Publication No. 2016-32392 (JP 2016-32392 A)).

In this method, the insertion of the conductor segment, the bending of the linear part, and the welding are performed such that insulating members, made of resin and called a cuff support, are attached to axial end surfaces of the stator core. The cuff support is an annular member including ribs corresponding to teeth of the stator core and openings corresponding to slots of the stator core. The conductor segment constituting the coil is inserted into a slot from a first side of the stator core, and the linear part of the conductor segment, projecting from an opening of the cuff support on a second side is bent in the circumferential direction on an upper side relative to a rib of the cuff support. When the coil is formed by bending and welding of the linear parts of the conductor segments, the coil and the cuff support are impregnated with varnish, so that the coil and the cuff support are fixed.

SUMMARY

Due to variability in bending shape at the time when the linear parts of the conductor segments are bent, a gap might be formed between bent parts of the conductor segments and the upper side of the cuff support. In this case, adhesion between the coil and the cuff support becomes insufficient, thereby resulting in that fixation between the coil and the cuff support with the varnish might be insufficient.

In view of this, the present disclosure provides a cuff support that improves an adhesion property with a coil.

A cuff support of an aspect of the present disclosure is a cuff support attached to an axial end surface of a stator core including an annular yoke, a plurality of teeth projecting toward an inner peripheral side of the yoke, and a plurality of slots formed between the teeth, and includes an annular plate making contact with the yoke, a plurality of ribs projecting toward an inner peripheral side of the annular plate so as to correspond to the teeth, and a plurality of spaces formed between the ribs so as to correspond to the slots. The cuff support is made of an elastic member. The ribs are being apart from the axial end surface of the stator core from roots of the ribs toward tip ends of the ribs. When a coil is wound around the teeth and the ribs so as to pass through the slots and the spaces, the ribs are brought into pressure contact with the coil due to an elastic force.

With this configuration, it is possible to improve an adhesion property between the coil and the cuff support.

The cuff support of the aspect of the present disclosure may include a cylindrical flange configured to connect the tip ends of the ribs to each other, and the flange may extend from the tip ends of the ribs toward an opposite side to the stator core.

Due to variability in bending shape at the time when linear parts of conductor segments are bent, bent parts of the conductor segments might protrude toward an inner peripheral side of the stator core, so that the coil approaches a rotor to increase a loss. However, the above configuration makes it possible to restrain the coil from protruding toward the inner peripheral side of the stator core.

The aspect of the present disclosure makes it possible to improve an adhesion property between the coil and the cuff support.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a sectional view illustrating bent parts in a state where linear parts of conductor segments are bent to form a coil, and the cuff support and the stator core in another embodiment; and FIG. 9 is a perspective view of a stator for a rotary electric machine using the cuff support according to another embodiment of the present disclosure.

DETAILED DESCRIPTION OF EMBODIMENTS

Figure 1:
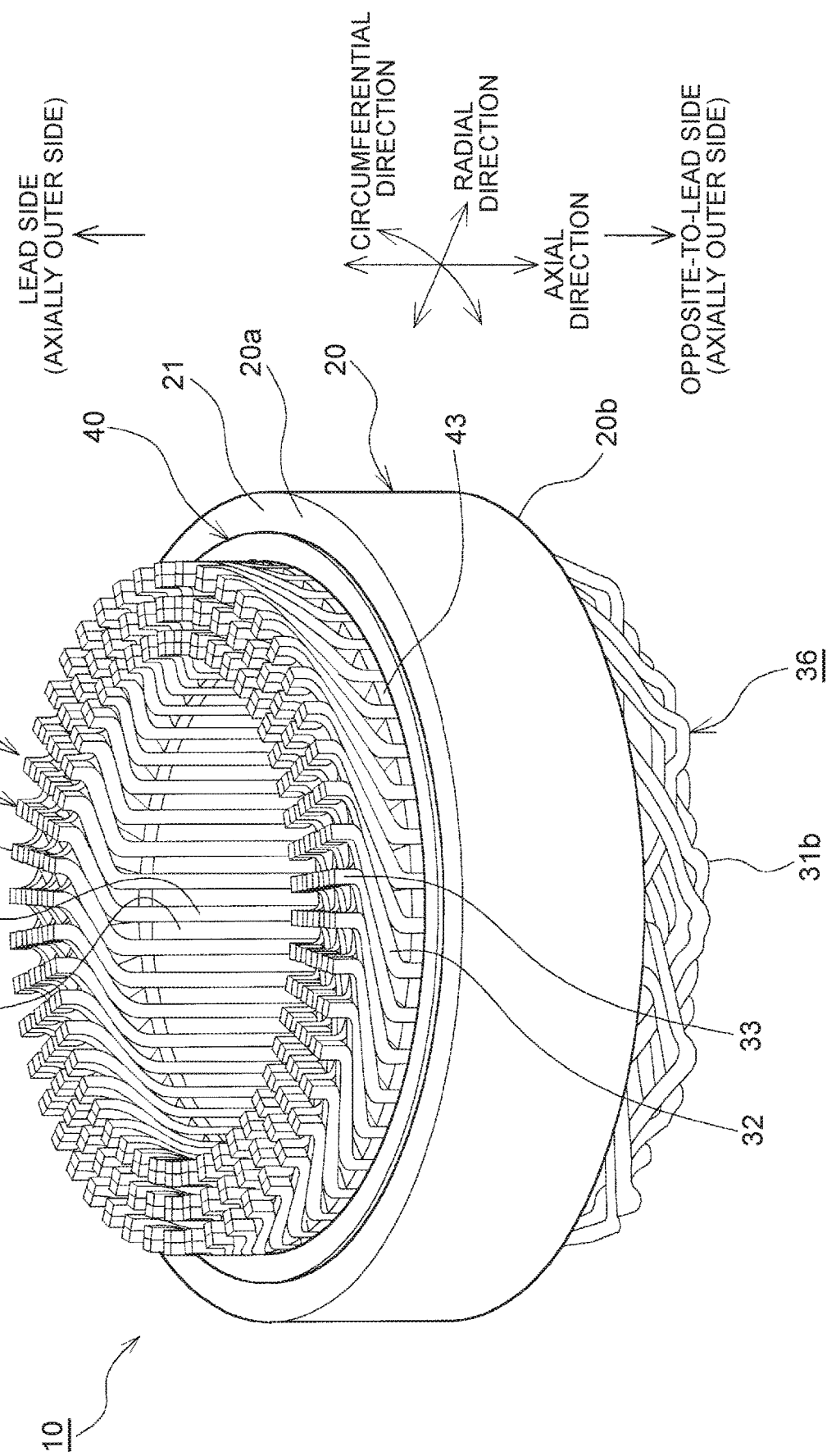
FIG. 1 is a perspective view illustrating a stator for a rotary electric machine using a cuff support according to an embodiment of the present disclosure.

With reference to the drawings, the following describes an embodiment of the present disclosure. First described is a stator 10 for a rotary electric machine constituted by use of a cuff support 40 of the present embodiment. As illustrated in FIG. 1, the stator 10 is constituted by a stator core 20, the cuff supports 40 attached to axial end surfaces 20a, 20b of the stator core 20, and a coil 30 wound around the stator core 20 and the cuff supports 40. Respective coil ends 35, 36 project axially outward from the axial end surfaces 20a, 20b of the stator core 20. Note that, since input and output terminals (not shown) of the coil 30 are attached to a coil-end-35 side of the stator 10 illustrated in FIG. 1, the coil-end-35 side of the stator 10 is referred to as a lead side and a coil-end-36 thereof is referred to as an opposite-to-lead side in the following description.

Figure 2:
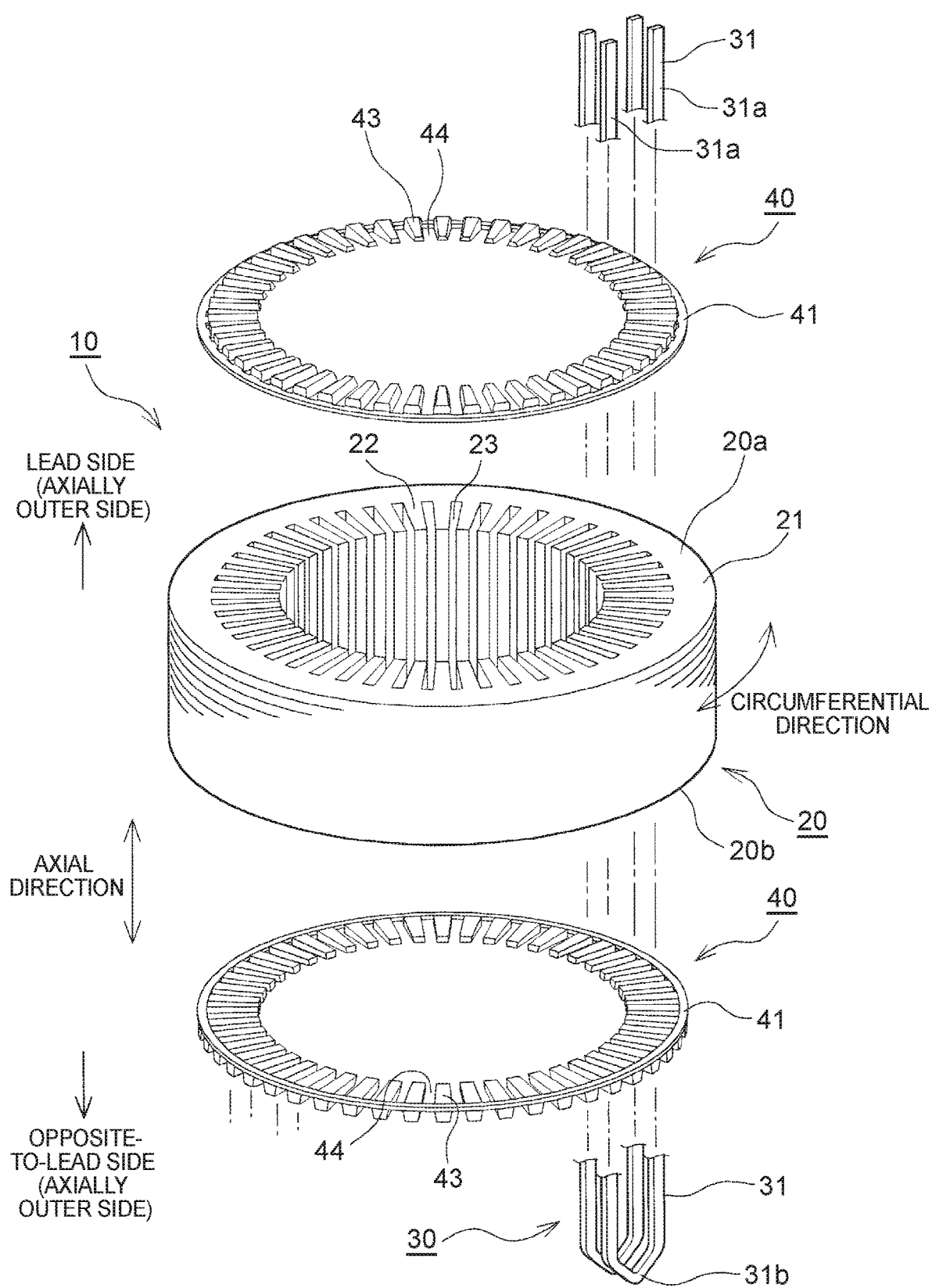
FIG. 2 is an exploded perspective view illustrating a structure of the stator illustrated in FIG. 1.

As illustrated in FIG. 2, the stator core 20 is configured such that a plurality of electromagnetic steel sheets is laminated. The stator core 20 includes an annular yoke 21 extending along a circumferential direction of the stator 10, and a plurality of teeth 22 projecting toward a radially inner side of the stator 10 from an inner peripheral surface of the yoke 21. The plurality of teeth 22 is placed at regular intervals in the circumferential direction of the stator 10. A slot 23 is formed between the teeth 22 adjacent to each other in the circumferential direction of the stator 10. A plurality of slots 23 is placed at regular intervals in the circumferential direction of the stator. The teeth 22 and the slots 23 extend along an axial direction.

The cuff support 40 is attached to the axial end surface 20a on the lead side of the stator core 20. The cuff support 40 is an insulating resin molding member, and is made of epoxy resin, for example.

Figure 3:
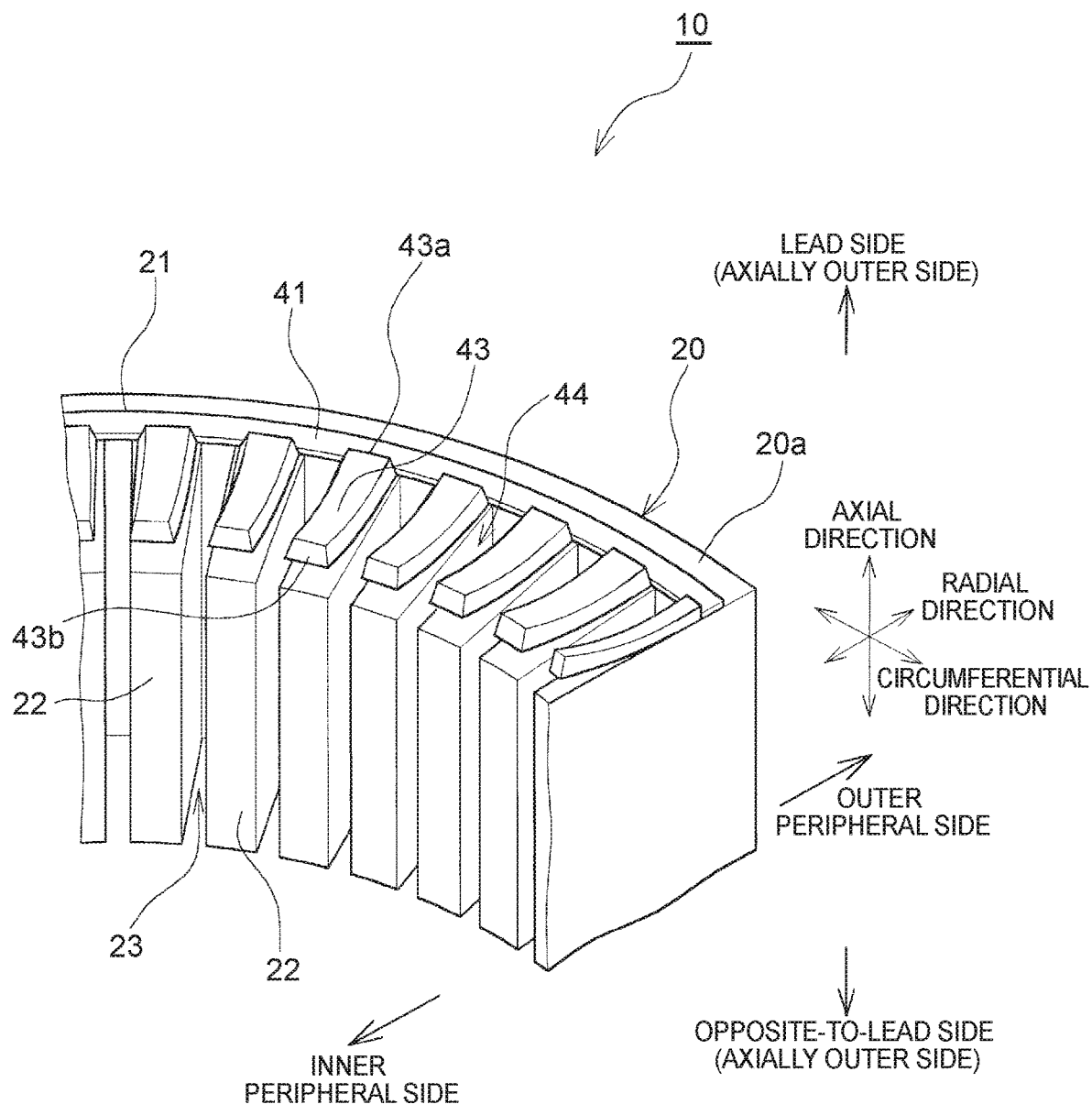
FIG. 3 is a perspective view illustrating a state where the cuff support of the embodiment of the present disclosure is placed on an axial end surface of a stator core.

As illustrated in FIG. 3, the cuff support 40 includes an annular plate 41 making contact with the yoke 21, a plurality of ribs 43 projecting toward an inner peripheral side of the annular plate 41 so as to correspond to the teeth 22, and a plurality of spaces 44 formed between the ribs 43 so as to correspond to the slots 23. The ribs 43 are formed in a comb shape in which respective roots 43a are connected to the annular plate 41 and respective tip ends 43b are apart from each other. The ribs 43 of the cuff support 40 are warped from the roots 43a toward the tip ends 43b so as to be apart axially outward from the axial end surface 20a of the stator core 20.

As illustrated in FIG. 2, the coil 30 is constituted by a plurality of conductor segments 31 inserted into all the slots 23 in the circumferential direction of the stator core 20. Note that FIG. 2 illustrates only a pair of conductor segments 31, but the conductor segments 31 are inserted into all the slots 23 of the stator core 20.

The conductor segment 31 has a U-shape, and includes two linear legs 31a, and a curved part 31b connecting them to each other. When the leg 31a of the conductor segment 31 is inserted into the space 44 of the cuff support 40 on the opposite-to-lead side and the slot 23, the leg 31a projects axially outward from the space 44 of the cuff support 40 on the lead side. A projecting part of the leg 31a from the space 44 of the cuff support 40 is bent in the circumferential direction, and welded to a leg 31a of another conductor segment 31, as illustrated in FIG. 1. Thus, the conductor segments 31 pass through the slots 23 and the spaces 44, so as to form the coil 30 wound around the teeth 22 and the ribs 43. Bend parts 32 and welded parts 33 on the lead side form the coil end 35 on the lead side. Further, the curved parts 31b of the conductor segments 31 project axially outward from the spaces 44 of the cuff support 40 on the opposite-to-lead side. The curved parts 31b form the coil end 36 on the opposite-to-lead side.

As has been described earlier with reference to FIG. 3, the ribs 43 of the cuff support 40 are warped from the roots 43a toward the tip ends 43b so as to be apart axially outwardly from the axial end surface 20a of the stator core 20. On this account, in a state where the cuff support 40 is attached to the axial end surface 20a of the stator core 20, as illustrated in FIG. 4, the annular plate 41 and the roots 43a of the ribs 43 make close contact with the axial end surface 20a, but the ribs 43 are apart from the axial end surface 20a from the roots 43a toward the tip ends 43b, such that a gap between the ribs 43 and the axial end surface 20a increases toward the inner peripheral side.

A shape of the rib 43 may be a shape inclined by a uniform inclination from the root 43a toward the tip end 43b, or may be a bending shape warped from the axial end surface 20a from the root 43a toward the tip end 43b. Alternatively, reversely to the above, the rib 43 may have a shape in which an angle formed with respect to the axial end surface 20a is larger in the root 43a, and the angle is decreased toward the tip end 43b.

As illustrated in FIG. 2, a cuff support 40 similar to the cuff support 40 attached to the axial end surface 20a on the lead side is attached in a reverse manner to the axial end surface 20b on the opposite-to-lead side of the stator core 20. Similarly to the lead side, in a state where the cuff support 40 is attached to the axial end surface 20b of the stator core 20 on the opposite-to-lead side, the annular plate 41 and the roots 43a of the ribs 43 make close contact with the axial end surface 20b, but the ribs 43 are apart from the axial end surface 20b from the roots 43a toward the tip ends 43b, such that a gap between the ribs 43 and the axial end surface 20b increases toward the inner peripheral side.

Figure 4:
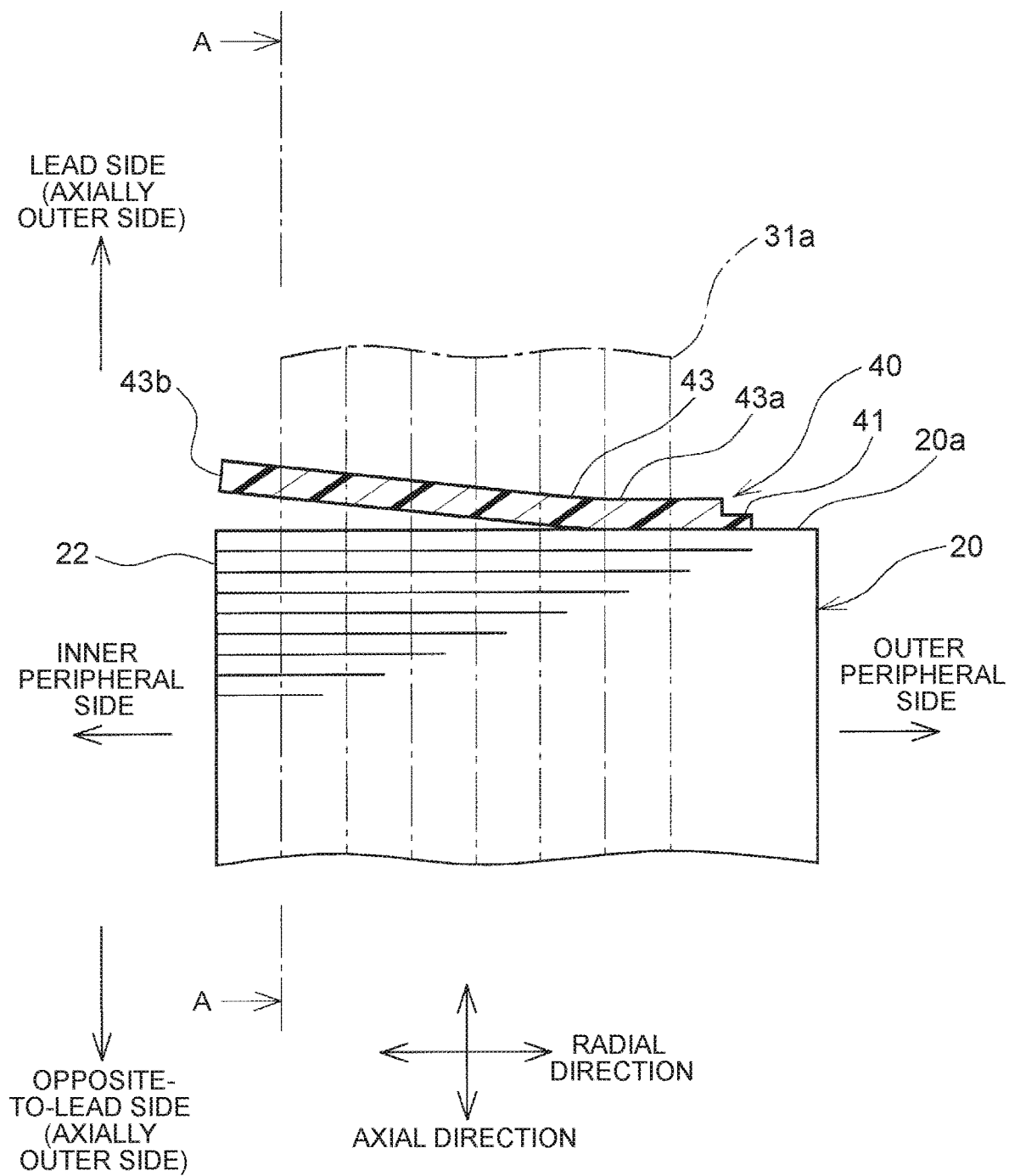
FIG. 4 is a sectional view illustrating a state where the cuff support of the embodiment of the present disclosure is placed on the axial end surface of the stator core.

When the leg 31a of the conductor segment 31 is inserted into the space 44 of the cuff support 40 on the opposite-to-lead side and the slot 23 in a state where the cuff supports 40 are attached to the axial end surfaces 20a, 20b of the stator core 20, the leg 31a projects axially outward from the space 44 of the cuff support 40 on the lead side as indicated by an alternate long and short dash line in FIG. 4. In this state, the tip ends 43b of the ribs 43 are apart from the axial end surface 20a.

Figure 5:
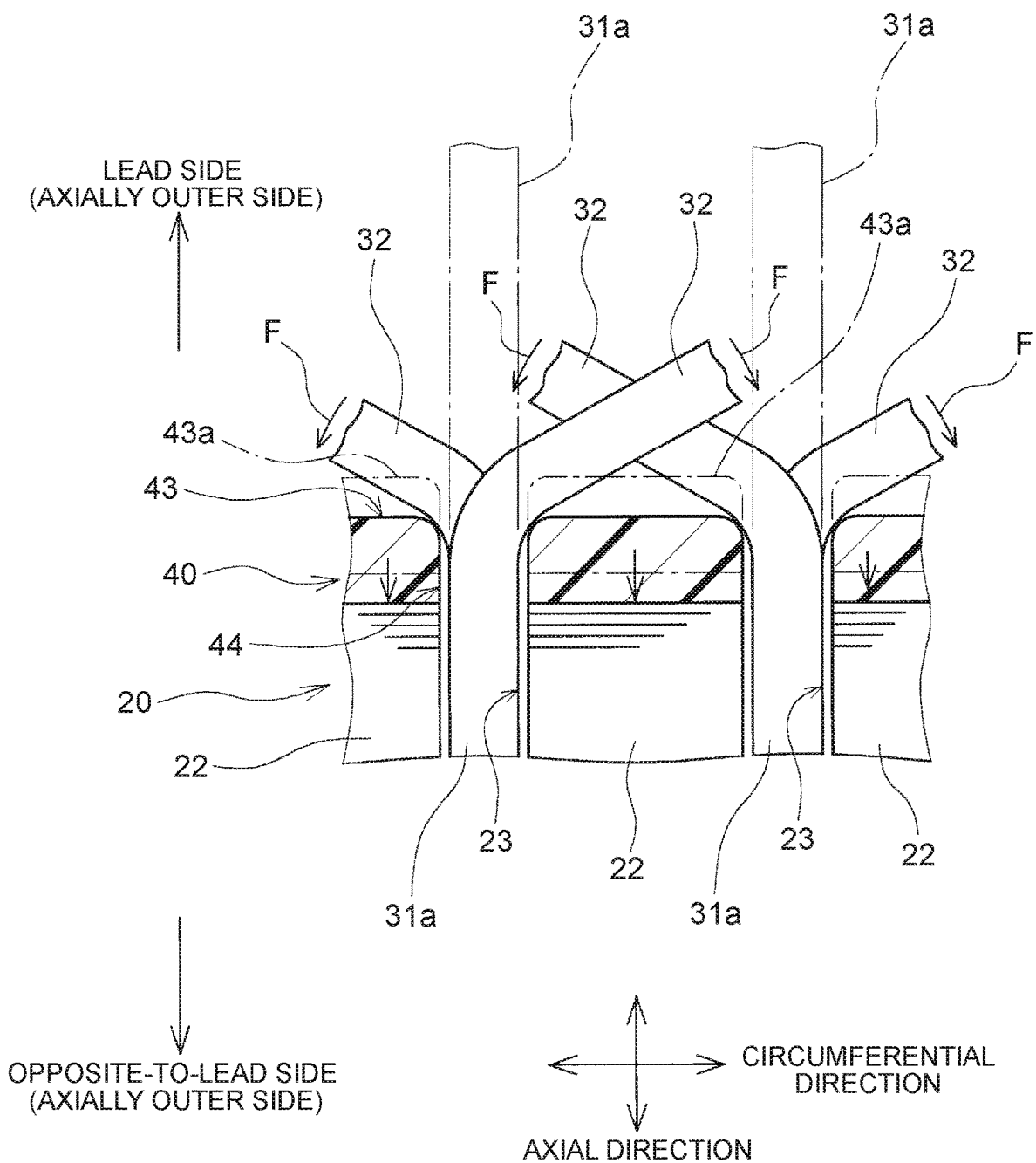
FIG. 5 is a circumferential developed sectional view (a A-A section illustrated in FIG. 4) illustrating a state where linear parts of conductor segments projecting from the cuff support are bent in a circumferential direction in a state illustrated in FIGS. 3, 4.
Figure 6:
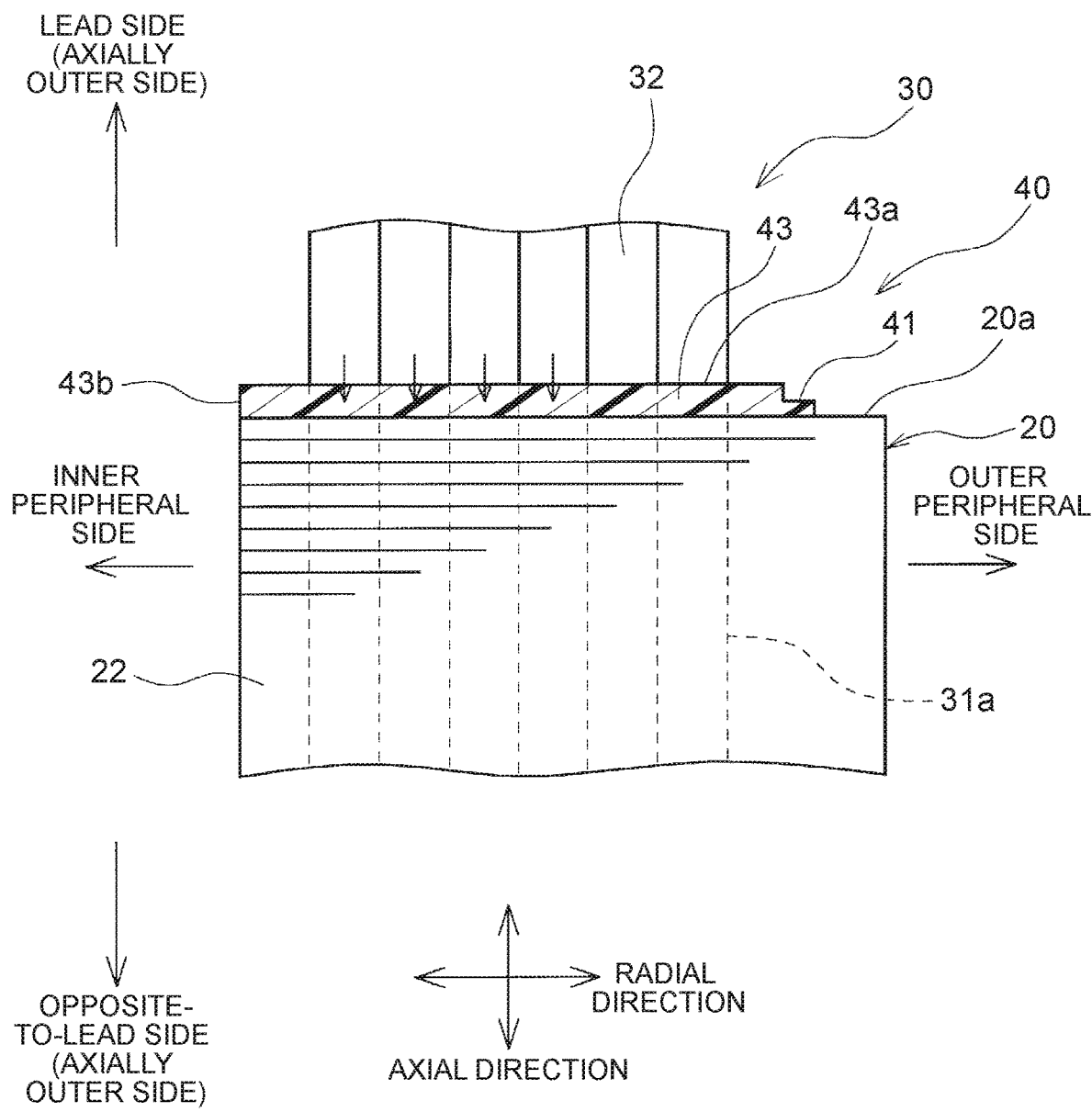
FIG. 6 is a sectional view illustrating the cuff support, the stator core, and bent parts in a state where the linear parts of the conductor segments are bent to form a coil as illustrated in FIG. 5.

When the leg 31a is bent in the circumferential direction as indicated by an arrow F of FIG. 5, a side surface of the bent part 32 abuts with a surface of the rib 43 on the lead side. When the leg 31a is further bent, the bent part 32 presses a tip end of the rib 43, distanced from the axial end surface 20a, toward the axial end surface 20a. Since the rib 43 is made of a resin elastic body, the surface of the rib 43 on the lead side (an axially outer side) is brought into pressure contact with the bent part 32 of the conductor segment 31 due to repulsion. When the bent part 32 is bent to a final shape, the rib 43 makes close contact with the axial end surface 20a of the stator core 20, as illustrated in FIG. 6.

Further, when the leg 31a is bent, an inclined surface of the curved part 31b of the conductor segment 31 on the opposite-to-lead side abuts with a surface of the rib 43 on the opposite-to-lead side, so that the surface of the rib 43 on the opposite-to-lead side (an axially outer side) is brought into pressure contact with the curved part 31b of the conductor segment 31 and the rib 43 makes close contact with the axial end surface 20b of the stator core 20.

As described above, the ribs 43 of the cuff support 40 of the present embodiment are warped from the roots 43a toward the tip ends 43b so as to be apart axially outwardly from the axial end surface 20a, 20b of the stator core 20. Accordingly, when the legs 31a of the conductor segments 31 are bent in the circumferential direction to form the coil 30, the ribs 43 are brought into pressure contact with the coil 30 due to an elastic force. Hereby, it is possible to improve an adhesion property between the coil 30 and the cuff support 40, thereby making it possible to sufficiently fix the coil 30 and the cuff support 40 with varnish.

Note that, in the cuff support 40 describe above, the ribs 43 are formed in a comb shape in which the tip ends 43b on the inner peripheral side are apart from each other, but the tip ends 43b may be connected to each other with a ring-shaped member.

Figure 7:
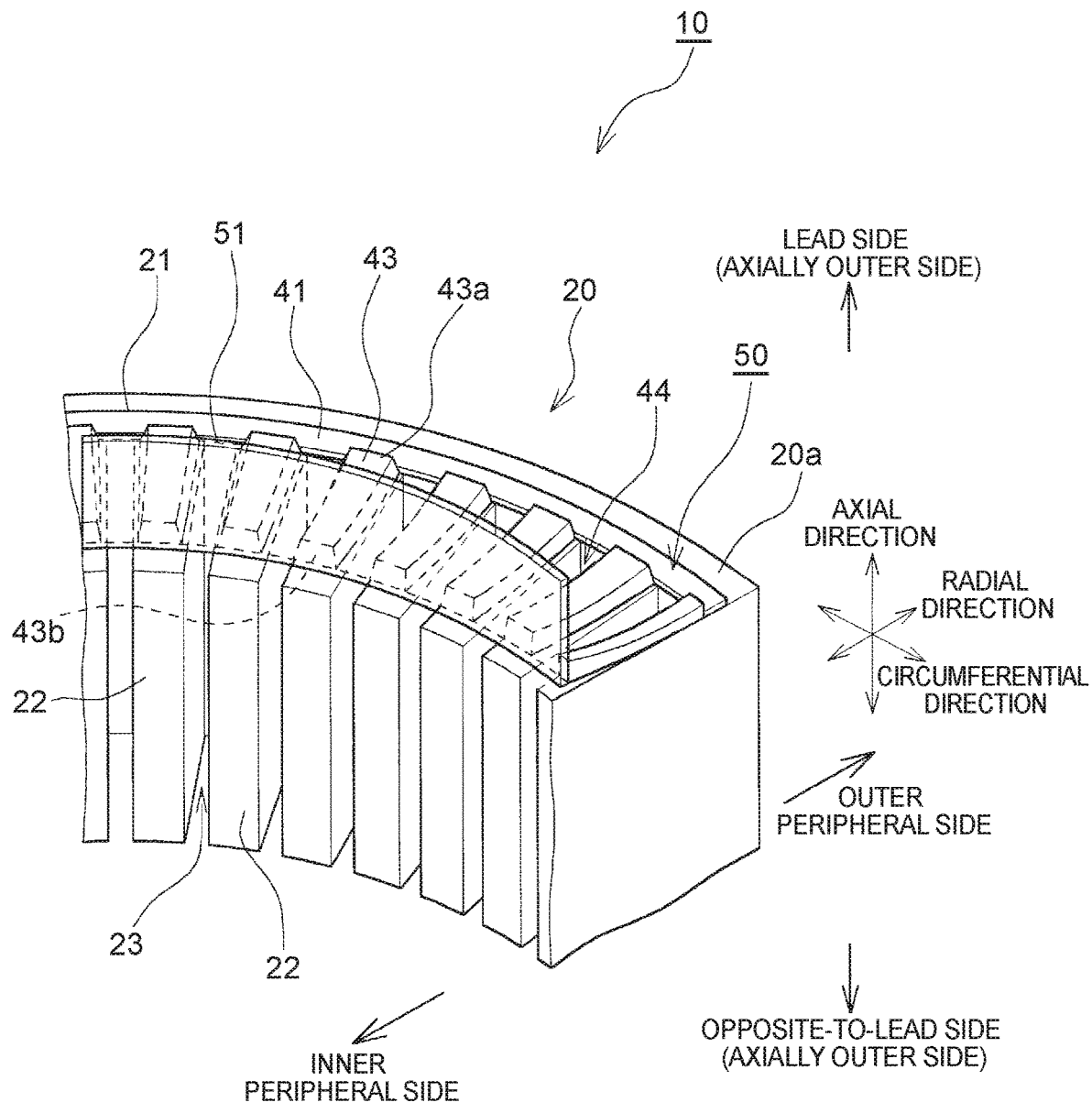
FIG. 7 is a perspective view illustrating a state where a cuff support of another embodiment of the present disclosure is placed on an axial end surface of a stator core.

With reference to FIGS. 7 to 9, the following describes a cuff support 50 of another embodiment of the present disclosure. A part similar to the cuff support 40 described with reference to FIGS. 1 to 6 has a similar reference sign, and a description thereof is omitted.

As illustrated in FIG. 7, the cuff support 50 of the present embodiment includes a cylindrical flange 51 configured to connect tip ends 43b of ribs 43 to each other. The annular flange 51 extends axially outward on an opposite side to an axial end surface 20a of a stator core 20 from the tip ends 43b of the ribs 43.

The cuff supports 50 as illustrated in FIG. 7 are attached to axial end surfaces 20a, 20b of the stator core 20, and in a similar manner to the above, conductor segments 31 are inserted into slots 23 and legs 31a are bent in the circumferential direction so as to form bent parts 32. Hereby, as illustrated in FIG. 8, a surface of the rib 43 on the lead side (the axially outer side) is brought into pressure contact with the bent parts 32 of the conductor segments 31 and the rib 43 makes close contact with the axial end surface 20a of the stator core 20. On the opposite-to-lead side, a surface of the rib 43 on the opposite-to-lead side is brought into pressure contact with inclined surfaces of curved parts 31b of the conductor segments 31 on the opposite-to-lead side, and the rib 43 makes close contact with the axial end surface 20b of the stator core 20.

As illustrated in FIGS. 8, 9, the flange 51 extends axially outward in a wall shape toward an axially outer side opposite to the axial end surface 20a of the stator core 20 from the tip ends 43b of the ribs 43 to a position of the bent parts 32 of the conductor segments 31. This makes it possible to restrain the bent parts 32 of the conductor segments 31 from tilting toward the inner peripheral side. Hereby, the cuff support 50 of the present embodiment restrains the coil 30 from protruding toward the inner peripheral side of the stator core 20, and to restrain the coil 30 from approaching a rotor to increase a loss.

What is claimed is:

1. A cuff support attached to an axial end surface of a stator core including an annular yoke, a plurality of teeth projecting toward an inner peripheral side of the yoke, and a plurality of slots formed between the teeth, the cuff support comprising:
    an annular plate making contact with the yoke;
    a plurality of ribs projecting toward an inner peripheral side of the annular plate so as to correspond to the teeth; and
    a plurality of spaces formed between the ribs so as to correspond to the slots,
    wherein the cuff support is made of an elastic member,
    the ribs are apart from the axial end surface of the stator core such that a distance between each of the ribs and the axial end surface of the stator core increases continuously and gradually toward a center of the annular plate in a radial direction of the annular plate,
    wherein each of the ribs extends from a root to a tip end thereof, and
    the ribs are curved from the roots to the tip ends so as to be apart from the axial end surface of the stator core.

2. The cuff support according to claim 1, further comprising a cylindrical flange configured to connect tip ends of the ribs to each other, the flange extending from the tip ends of the ribs toward an opposite side to the stator core.

3. The cuff support according to claim 1, wherein the ribs are attached to the axial end surface of the stator core at the roots of the ribs.

* * * * *